United States Patent
Parenti et al.

(10) Patent No.: US 11,945,278 B2
(45) Date of Patent: Apr. 2, 2024

(54) ENHANCED VEHICLE SUSPENSION

(71) Applicant: Ford Global Technologies, LLC, Dearborn, MI (US)

(72) Inventors: Robert Parenti, Dearborn, MI (US); Faizan Shaik, Ann Arbor, MI (US); Medha Karkare, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 17/356,646

(22) Filed: Jun. 24, 2021

(65) Prior Publication Data
US 2022/0410648 A1 Dec. 29, 2022

(51) Int. Cl.
*B60G 17/019* (2006.01)
*B60G 17/016* (2006.01)

(52) U.S. Cl.
CPC ......... *B60G 17/019* (2013.01); *B60G 17/016* (2013.01); *B60G 17/0164* (2013.01); *B60G 2400/96* (2013.01); *B60G 2600/18* (2013.01)

(58) Field of Classification Search
CPC ............ B60G 17/019; B60G 17/01908; B60G 17/016; B60G 17/0164; B60G 2400/96; B60G 2600/18–189
USPC ........................................ 701/37–44, 70–81
See application file for complete search history.

(56) References Cited

U.S. PATENT DOCUMENTS

| | | |
|---|---|---|
| 2013/0305806 A1 | 11/2013 | Saito et al. |
| 2014/0297119 A1* | 10/2014 | Giovanardi ........... F16K 11/065 701/38 |
| 2015/0224845 A1* | 8/2015 | Anderson ............ B60G 17/019 701/37 |
| 2016/0370239 A1 | 12/2016 | Cummings |
| 2019/0059791 A1 | 2/2019 | Noro et al. |
| 2020/0097744 A1 | 3/2020 | Nakamura et al. |
| 2022/0242417 A1* | 8/2022 | Berger .................. A61B 5/1114 |
| 2023/0143296 A1* | 5/2023 | Giovanardi ........... B60W 10/30 701/37 |

FOREIGN PATENT DOCUMENTS

WO  2020089370 A1  5/2020

OTHER PUBLICATIONS

Doosti, B. et al., "HOPE-Net: A Graph-based Model for Hand-Object Pose Estimation," arXiv:2004.00060v1 [cs.CV], Mar. 31, 2020, 10 pages.

Deng, J. et al., "RetinaFace: Single-stage Dense Face Localisation in the Wild," arXiv:1905.00641v2 [cs.CV], May 4, 2019, 10 pages.

* cited by examiner

Primary Examiner — Erick R Solis
(74) Attorney, Agent, or Firm — Frank Lollo; Bejin Bieneman PLC (57) ABSTRACT

An acceleration of a head of an occupant of a vehicle relative to the vehicle is determined based on data describing motion of the vehicle and respective poses of the head from a plurality of consecutive frames of image data. A vehicle suspension is adjusted based on the determined acceleration.

18 Claims, 4 Drawing Sheets

ENHANCED VEHICLE SUSPENSION

BACKGROUND

Vehicles can be equipped with computing devices (e.g., controllers and the like), networks, and sensors to acquire data regarding vehicle operation and/or the vehicle's environment. The computing devices can operate the vehicle based on the data. Vehicle sensors can provide data concerning, e.g., a vehicle speed, a vehicle acceleration, etc. Occupants in the vehicle can experience vibrations caused by deviations of road surfaces on a roadway.

DETAILED DESCRIPTION

A system includes a computer including a processor and a memory, the memory storing instructions executable by the processor to determine an acceleration of a head of an occupant of a vehicle relative to the vehicle based on data describing motion of the vehicle and respective poses of the head from a plurality of consecutive frames of image data and adjust a vehicle suspension based on the determined acceleration.

The instructions can further include instructions to determine a roll acceleration of the head, a yaw acceleration of the head, and a pitch acceleration of the head.

The instructions can further include instructions to determine, based on the image data of the head, an absolute roll acceleration of the head, an absolute yaw acceleration of the head, and an absolute pitch acceleration of the head.

The instructions can further include instructions to determine the relative acceleration of the head as a difference between the absolute roll, yaw, and pitch accelerations and an acceleration of the vehicle.

The instructions can further include instructions to adjust a stiffness of a damper of the vehicle suspension based on the determined acceleration of the head.

The instructions can further include instructions to determine a respective bounding box enclosing the head of the occupant of each image of the image data.

The instructions can further include instructions to determine, based on the bounding boxes, an absolute acceleration of the head.

The instructions can further include instructions to determine the acceleration of the head based on a difference between the bounding boxes of consecutive frames of the image data and a difference between the accelerations of the head of consecutive frames of the image data.

The instructions can further include instructions to determine a velocity of the head of the occupant and to adjust the vehicle suspension based on the velocity and the determined acceleration of the head.

The instructions can further include instructions to identify a lateral acceleration of the vehicle and a longitudinal acceleration of the vehicle.

The instructions can further include instructions to determine the acceleration of the head of the occupant relative to the vehicle based on a difference between the lateral and longitudinal accelerations of the vehicle and an angular acceleration of the head of the occupant.

The angular acceleration of the head of the occupant can be at least one of a roll acceleration of the head, a yaw acceleration of the head, or a pitch acceleration of the head.

A method includes determining an acceleration of a head of an occupant of a vehicle relative to the vehicle based on data describing motion of the vehicle and respective poses of the head from a plurality of consecutive frames of image data and adjusting a vehicle suspension based on the determined acceleration.

The instructions can further include instructions to determine a roll acceleration of the head, a yaw acceleration of the head, and a pitch acceleration of the head.

The instructions can further include instructions to determine, based on the image data of the head, an absolute roll acceleration of the head, an absolute yaw acceleration of the head, and an absolute pitch acceleration of the head.

The method can further include determining the relative acceleration of the head as a difference between the absolute roll, yaw, and pitch accelerations and an acceleration of the vehicle.

The method can further include adjusting a stiffness of a damper of the vehicle suspension based on the determined acceleration of the head.

The method can further include determining a respective bounding box enclosing the head of the occupant of each image of the image data.

The method can further include determining, based on the bounding boxes, an absolute acceleration of the head.

The method can further include determining the acceleration of the head based on a difference between the bounding boxes of consecutive frames of the image data and a difference between the accelerations of the head of consecutive frames of the image data.

The method can further include determining a velocity of the head of the occupant and to adjust the vehicle suspension based on the velocity and the determined acceleration of the head.

The method can further include identifying a lateral acceleration of the vehicle and a longitudinal acceleration of the vehicle.

The method can further include determining the acceleration of the head of the occupant relative to the vehicle based on a difference between the lateral and longitudinal accelerations of the vehicle and an angular acceleration of the head of the occupant.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Ride characteristics experienced by an occupant of a vehicle can be estimated with sensor data about the vehicle and the roadway, such as vehicle speed, vehicle acceleration, road grade, surface flatness, etc. As the vehicle moves along the roadway, the occupant experiences accelerations that can affect ride characteristics. Typically, a computer collects data about the vehicle, and not the occupant, to estimate the ride characteristics of the occupant and to adjust components, such as a suspension, to improve ride comfort.

Using image data of the occupant, the computer can detect accelerations of the occupant, particularly an acceleration of a head of the occupant relative to the vehicle. The computer can determine the acceleration of the head by inputting the image data to a machine learning program that tracks movement of the head in consecutive images of the image data. Based on the tracked movement, the machine learning program can output an acceleration of the head of the occupant relative to the vehicle. These accelerations can affect ride characteristics of the occupant, and the computer can adjust an operation mode of a suspension to reduce the acceleration of the head. Thus, the computer can improve ride characteristics experienced by an occupant in the vehicle.

Figure 1:
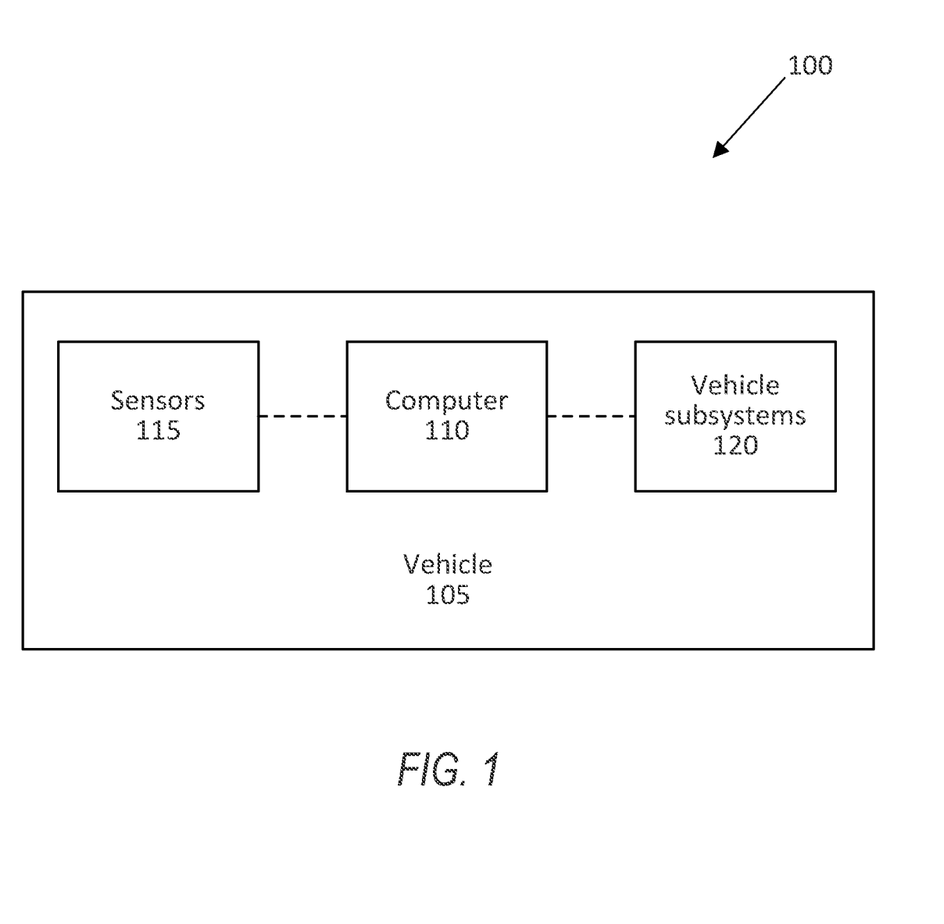
FIG. 1 is a block diagram of an example system for operating a suspension of a vehicle.

FIG. 1 illustrates an example system 100 for operating a suspension of a vehicle 105. A computer 110 in the vehicle 105 is programmed to receive collected data from one or more sensors 115. For example, vehicle data may include a location of the vehicle 105, data about an environment around a vehicle, data about an object outside the vehicle such as another vehicle, etc. A vehicle location is typically provided in a conventional form, e.g., geo-coordinates such as latitude and longitude coordinates obtained via a navigation system that uses the Global Positioning System (GPS). Further examples of data can include measurements of vehicle systems and components, e.g., a vehicle velocity, a vehicle trajectory, etc.

A vehicle 105 may be any suitable type of ground vehicle 105, e.g., a passenger or commercial automobile such as a sedan, a coupe, a truck, a sport utility, a crossover, a van, a minivan, a taxi, a bus, etc.

The vehicle computer 110 includes a processor and a memory such as are known. The memory includes one or more forms of computer 110 readable media, and stores instructions executable by the vehicle 105 computer 110 for performing various operations, including as disclosed herein. For example, the computer 110 can be a generic computer 110 with a processor and memory as described above and/or may include an electronic control unit (ECU) or controller for a specific function or set of functions, and/or a dedicated electronic circuit including an ASIC that is manufactured for a particular operation, e.g., an ASIC for processing sensor 115 data and/or communicating the sensor 115 data. In another example, computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical subsystems 120 inside an FPGA may be configured based on VHDL programming, e.g. stored in a memory electrically connected to the FPGA circuit. In some examples, a combination of processor(s), ASIC(s), and/or FPGA circuits may be included in a computer 110. The memory can be of any type, e.g., hard disk drives, solid state drives, servers, or any volatile or non-volatile media.

The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110. The computer 110 may include programming to operate one or more of vehicle brakes, propulsion (e.g., control of acceleration in the vehicle 105 by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle network such as a communications bus as described further below, more than one processor, e.g., included in subsystems 120 such as sensors 115, electronic controller units (ECUs) or the like included in the vehicle 105 for monitoring and/or controlling various vehicle subsystems 120, e.g., a powertrain controller, a brake controller, a steering controller, etc. The computer 110 is generally arranged for communications on a vehicle communication network that can include a bus in the vehicle 105 such as a controller area network (CAN) or the like, and/or other wired and/or wireless mechanisms. Alternatively or additionally, in cases where the computer 110 actually comprises a plurality of devices, the vehicle communication network may be used for communications between devices represented as the computer 110 in this disclosure. Further, as mentioned below, various controllers and/or sensors 115 may provide data to the computer 110 via the vehicle communication network.

Vehicles 105, such as autonomous or semi-autonomous vehicles 105, typically include a variety of sensors 115. A sensor 115 is a device that can obtain one or more measurements of one or more physical phenomena. Some sensors 115 detect internal states of the vehicle 105, for example, wheel speed, wheel orientation, and engine and transmission variables. Some sensors 115 detect the position or orientation of the vehicle 105, for example, global positioning system (GPS) sensors 115; accelerometers such as piezoelectric or microelectromechanical systems (MEMS); gyroscopes such as rate, ring laser, or fiber-optic gyroscopes; inertial measurements units (IMU); and magnetometers. Some sensors 115 detect the external world, for example, radar sensors 115, scanning laser range finders, light detection and ranging (LIDAR) devices, and image processing sensors 115 such as cameras. A LIDAR device detects distances to objects by emitting laser pulses and measuring the time of flight for the pulse to travel to the object and back. Some sensors 115 are communications devices, for example, vehicle-to-infrastructure (V2I) or vehicle-to-vehicle (V2V) devices. sensor 115 operation can be affected by obstructions, e.g., dust, snow, insects, etc. Often, but not necessarily, a sensor 115 includes a digital-to-analog converter to converted sensed analog data to a digital signal that can be provided to a digital computer 110, e.g., via a vehicle network. sensors 115 can include a variety of devices, and can be disposed to sense and environment, provide data about a machine, etc., in a variety of ways. For example, a sensor 115 could be mounted to a stationary infrastructure element on, over, or near a road. Moreover, various controllers in a vehicle 105 may operate as sensors 115 to provide data via the vehicle network or bus, e.g., data relating to vehicle 105 speed, acceleration, location, subsystem and/or subsystem status, etc. Further, other sensors 115, in or on a vehicle 105, stationary infrastructure element, etc., infrastructure could include cameras, short range radar, long range radar, LIDAR, and/or ultrasonic transducers, weight sensors 115, accelerometers, motion detectors, etc., i.e., sensors 115 to provide a variety of data. To provide just a few non-limiting examples, sensor 115 data could include data for determining a position of a subsystem 120, a location of an object, a speed of an object, a type of an object, a slope of a roadway, a temperature, a presence or amount of moisture, a fuel level, a data rate, etc.

The vehicle 105 can include a plurality of vehicle subsystems 120. In this context, each vehicle subsystem 120 includes one or more hardware components adapted to perform a mechanical function or operation—such as moving the vehicle 105, slowing or stopping the vehicle 105, steering the vehicle 105, etc. Non-limiting examples of subsystems 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Subsystems 120 can include computing devices, e.g., electronic control units (ECUs) or the like and/or computing devices such as described above with respect to the computer 110, and that likewise communicate via a vehicle 105 network.

A vehicle network can include a conventional vehicle communications bus such as a CAN bus, LIN bus, etc., and or other wired and/or wireless technologies, e.g., Ethernet, Wi-Fi®, cellular, Bluetooth®, Bluetooth® Low Energy (BLE), etc. Via the network, bus, and/or other wired or wireless mechanisms (e.g., a wired or wireless local area network in the vehicle 105). Accordingly, a vehicle computer 110, ECU etc., may transmit messages to various devices in a vehicle 105 and/or receive messages from the various devices, e.g., ECUs, controllers, actuators, sensors 115, etc.

Figure 2:
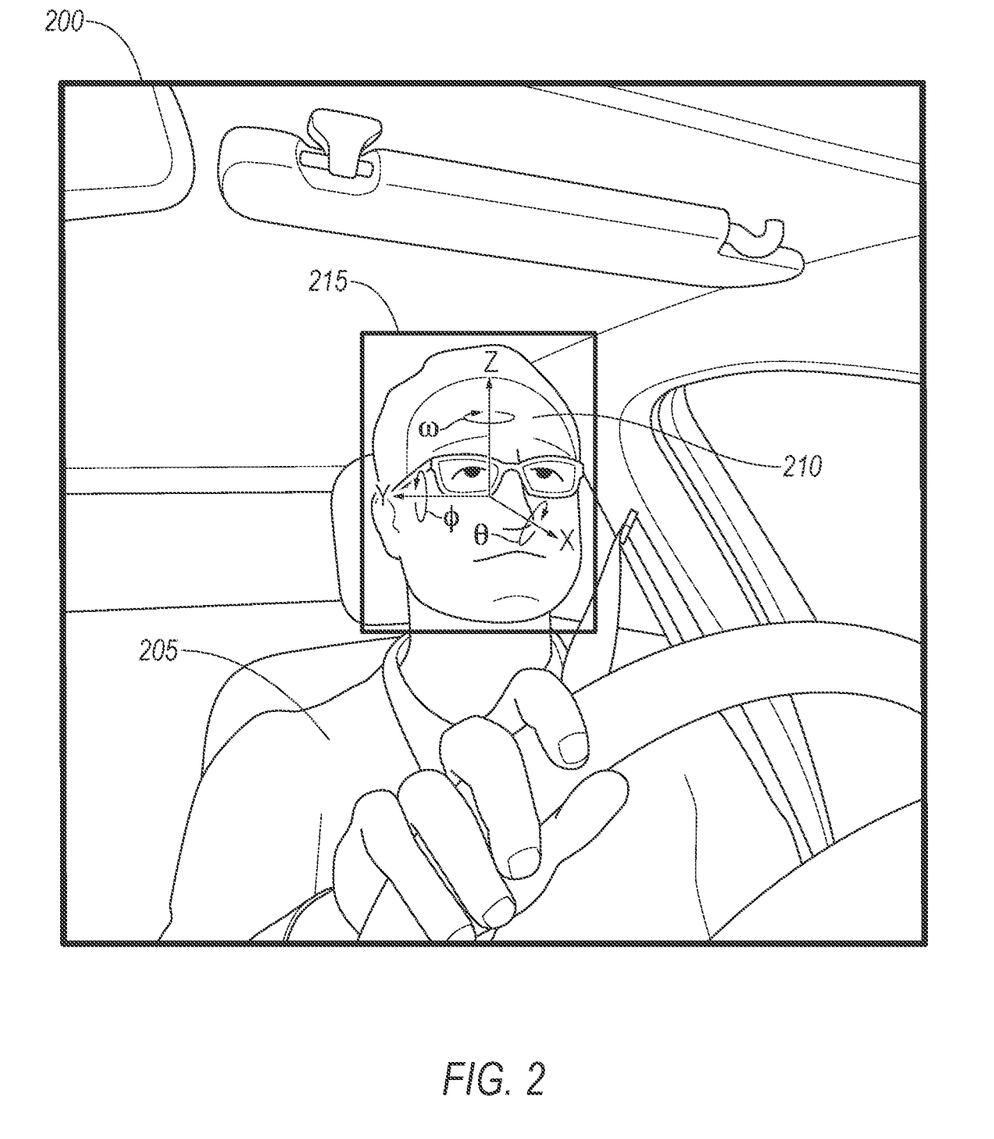
FIG. 2 is an example image of an occupant in the vehicle.

FIG. 2 is an example image 200 of an occupant 205 of a vehicle 105. The vehicle 105 includes a camera that can collect the images 200 of the occupant 205, i.e., a plurality of images 200 that can be stored in the memory of the computer 110. An image 200 can include a head 210 of the occupant 205. The computer 110 defines a three-dimensional coordinate system having X, Y, Z orthogonal axes and θ, φ, ω rotational coordinates about the X, Y, Z axes, respectively.

The computer 110 can collect data describing motion of the vehicle 105. The data can include a speed and an acceleration of the vehicle 105. The computer 110 can collect the data from sensors 115 and/or controllers via the CAN bus, for example. The acceleration can include a lateral acceleration and a longitudinal acceleration, i.e., accelerations in the lateral and longitudinal directions. The "lateral" direction, as shown in FIG. 2, is a cross-vehicle 105 direction extending left-to-right relative to the occupant 205 and extends along the Y axis. The "longitudinal" direction is a vehicle 105-forward direction extending forward relative to the occupant 205 and extends along the X axis. The computer 110 determines the longitudinal acceleration $\ddot{X}$ and the lateral acceleration $\ddot{Y}$ based on an absolute acceleration a and a heading angle γ of the vehicle 105 determined detected by one or more sensors 115:

$$\ddot{X} = a \cdot a \cos(\gamma) \quad (1)$$

$$\ddot{Y} = a \cdot a \sin(\gamma) \quad (2)$$

where a cos( ) is the inverse cosine function and a sin( ) is the inverse sine function, as are known. The "heading angle" γ is an angle of movement of the vehicle 105 relative to the longitudinal x axis and can be determined with a heading angle sensor 115. The absolute acceleration α can be determined with an accelerometer sensor 115.

The computer 110 can input the image data to a machine learning program trained to detect a face of the occupant 205. The machine learning program can be a face detector program that generates a bounding box 215 of the head 210 of the occupant 205. A "bounding box" is a rectangle that surrounds pixels that are identified as the "face" of the occupant 205 in the image 200. The face detector program can be a conventional program, e.g., RetinaFace, described in *RetinaFace: Single-stage Dense Face Localisation in the Wild* (available at the time of filing at https://arxiv.org/abs/1905.00641). The face detector program receives, as input, the image data, and the face detector program identifies a bounding box 215 and facial landmarks in each image 200. The facial landmarks are specified points on the face based on ground-truth facial data. The bounding box 215 is thus a smallest rectangle that encloses all identified facial landmarks. The face detector program can be trained with a conventional database of annotated images 200, such as the database used to train RetinaFace. Thus, the face detector program identifies the bounding box 215 enclosing the head 210 of the occupant 205 in each image 200 of the image data.

The computer 110 can input the image data with the determined bounding boxes 215 to a second machine learning program trained to determine a pose of the face. The "pose" is the set of three-dimensional coordinates of each pixel in the image 200, i.e., X, Y, Z coordinates and θ, φ, ω rotational coordinates. That is, the pose of each pixel includes the linear coordinates and the angular values of yaw (represented as the ω coordinate), pitch (represented as the φ coordinate), and roll (represented as the θ coordinate). The machine learning program can be a conventional pose estimation program, e.g., Hopenet, described in *HOPE-Net: A Graph-based Model for Hand-Object Pose Estimation* (available at the time of filing at https://arxiv.org/abs/2004.00060). The pose estimation program outputs the roll, pitch, and yaw angles θ, φ, ω for the head 210 of the occupant 205 by minimizing a loss function across three fully connected layers, one layer for each of the yaw, pitch, and roll angles. That is, the bounding boxes 215 in the image data are pooled and convoluted across a plurality of layers to estimate the pose, and each of the fully connected layers uses a softmax algorithm to output one of the yaw, pitch, and roll angle values. The predicted values for the pose are backpropagated through the layers until the loss function is minimized. The pose estimation program then outputs the yaw, pitch, and roll angles that minimized the loss function.

The computer 110 can determine absolute angular accelerations of the head 210 based on the determined poses from the image data. The absolute angular accelerations include an absolute roll acceleration $\ddot{\theta}$, an absolute pitch acceleration $\ddot{\phi}$, and an absolute yaw acceleration $\ddot{\omega}$. The computer 110 can determine the angular accelerations based on timestamps of each image 200. That is, the angular accelerations $\ddot{\theta}, \ddot{\phi}, \ddot{\omega}$ can be determined based on time differences between poses of consecutive images 200, e.g., as shown in expressions 1-3:

$$\ddot{\theta}_i = \frac{(\theta_i - 2\theta_{i+1} + \theta_{i+2})}{t^2} \quad (3)$$

$$\ddot{\phi}_i = \frac{(\phi_i - 2\phi_{i+1} + \phi_{i+2})}{t^2} \quad (4)$$

-continued $$\ddot{\omega}_i = \frac{(\omega_i - 2\omega_{i+1} + \omega_{i+2})}{t^2} \quad (5)$$

where i is an integer indicating an index identifying an image 200 in the image data and t is a time difference between consecutive images 200.

Alternatively or additionally, the computer 110 can use a pose tracker program to determine the change in the coordinates of the bounding boxes between consecutive images 200 and can determine the speed and acceleration of the head 210 based on the change in coordinates. For example, the computer 110 can use a Kalman filter trained to output the accelerations $\ddot{\theta}$, $\ddot{\phi}$, $\ddot{\omega}$ of the head 210. The Kalman filter can determine a covariance, as is known, of the angle values determined above from a mean angle value and can output the accelerations $\ddot{\theta}$, $\ddot{\phi}$, $\ddot{\omega}$ of the head based on the covariances.

The computer 110 can determine the acceleration α of the head 210 relative to the vehicle 105 with a transformation matrix. The transformation matrix is a matrix that converts the absolute accelerations $\ddot{\theta}$, $\ddot{\phi}$, $\ddot{\omega}$ of the head 210 determined by the pose tracker program above to a relative acceleration α using a conventional coordinate-transformation matrix. That is, the transformation matrix can be a predetermined coordinate-transformation matrix determined based on conventional dynamics models. The computer 110 can output the acceleration α in units of "g-force" G, where 1 G is equivalent to the acceleration of Earth's gravity, i.e., about 9.8 m/s². Because various settings in a vehicle 105 can be determined based on accelerations in units of g-force, determining the acceleration α of the head 210 in units of g-force allows the computer 110 to actuate subsystems 120 without further converting the units of the acceleration values.

Figure 3:
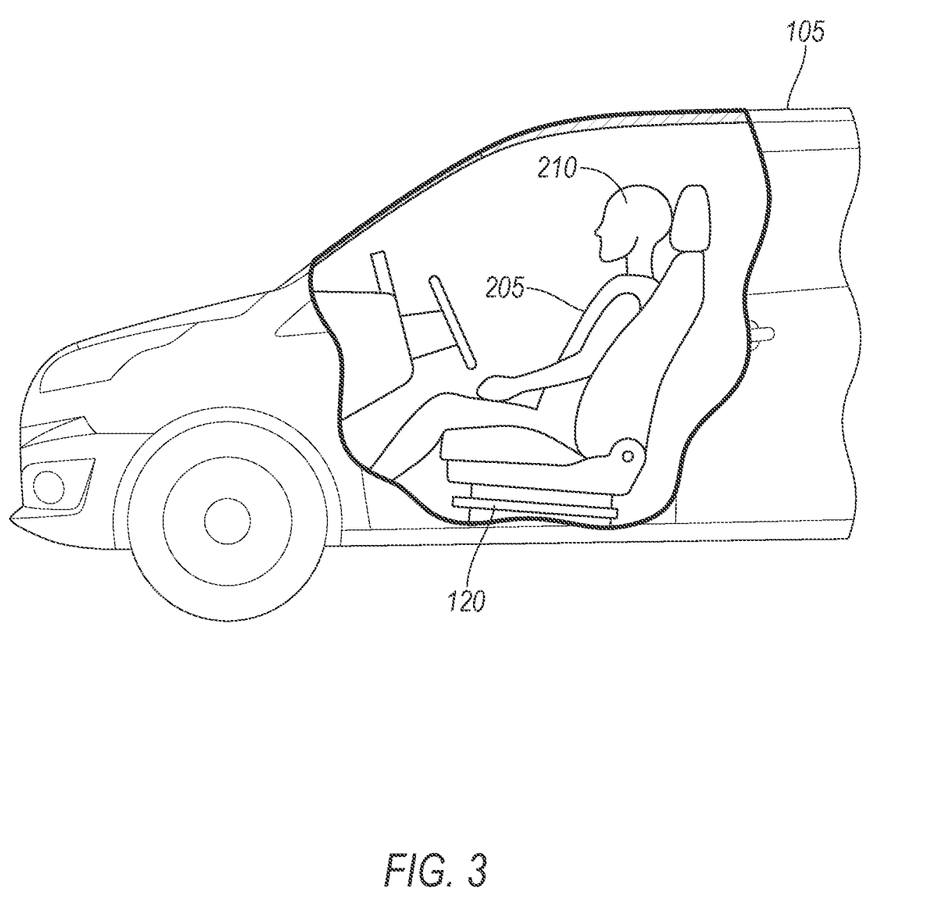
FIG. 3 is a side view of an example suspension in the vehicle.

FIG. 3 is a view of an example suspension 120 of the vehicle 105. The suspension 120 absorbs vibrations from the roadway, reducing vibrations absorbed by the occupant 205 in the vehicle 105. That is, the vibrations of the roadway can increase accelerations and jerks on the occupant 205, and the suspension 120 can reduce the accelerations felt by the occupant 205. By adjusting one or more settings of the suspension 120, the computer 110 can reduce acceleration of the head 210 of the occupant 205. For example, the computer 110 can adjust a stiffness of a damper of the suspension 120 based on the angular accelerations determined by the computer 110 described above.

The suspension 120 can operate in one of a plurality of operation modes. In this context, an "operation mode" is a set of settings of one or more parts of the suspension 120 that adjust operation of the suspension 120. That is, each operation mode provides specific settings for a different type of vehicle 105 operation. A "setting" in this context is a parameter, i.e. value, specified for operation of the suspension 120, e.g., a stiffness of a damper. The operation mode can include a "normal" mode intended for dry, flat surfaces, a "sport" mode for operating at speeds higher than the normal mode, a "tow/haul" mode for towing objects such as trailers, a "snow" mode for precipitation and snow on the roadway, and a "mud" mode for viscous material (such as mud) on the roadway.

The computer 110 can, upon determining the acceleration of the head 210 of the occupant 205, specify one of the operation modes of the suspension 120. For example, the computer 110 can include a lookup table or the like that correlates specified accelerations to one of the operation modes:

TABLE 1

| Suspension Adjustment | | |
|---|---|---|
| Acceleration | Operation Mode | Component Setting |
| <1 G | Normal | Standard |
| 1 ≤ 2 G | Sport | Increase camber angle |
| 2 ≤ 5 G | Tow/Haul | Increase steering torque |
| 5 ≤ 7 G | Snow | Increase damper stiffness |
| >7 G | Mud | Decrease brake pressure |

Figure 4:
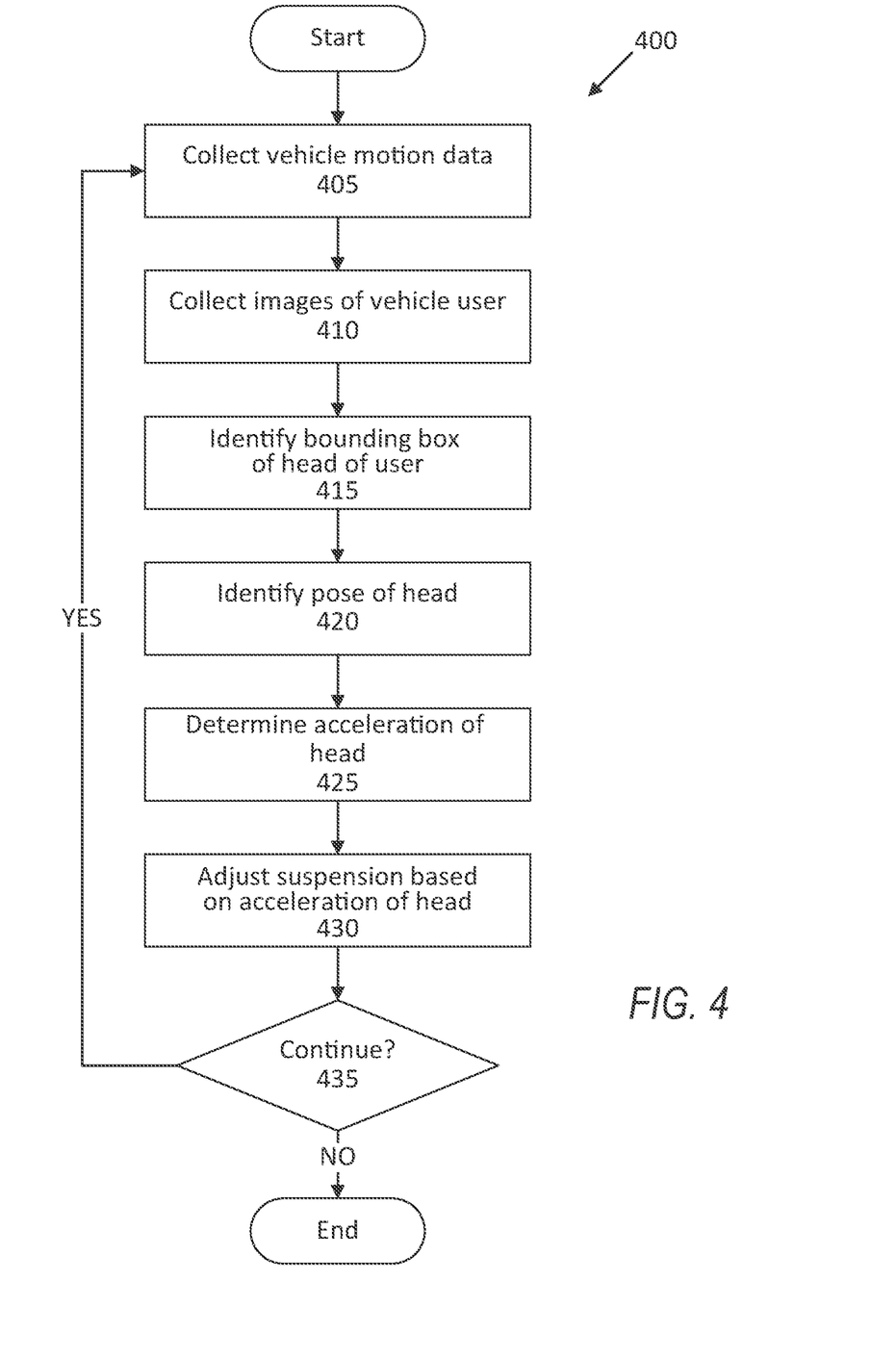
FIG. 4 is a block diagram of an example process for operating the suspension of the vehicle.

FIG. 4 is a block diagram of an example process 400 for operating a suspension 120 of a vehicle 105. The process 400 begins in a block 405, in which a computer 110 collects data describing motion of the vehicle 105 with one or more sensors 115. The computer 110 can collect data of the speed and acceleration of the vehicle 105 in a three-dimensional coordinate system, as described above.

Next, in a block 410, the computer 110 actuates a camera 115 to collect a plurality of images 200 of a head 210 of an occupant 205. As described above, the camera 115 can be placed in a passenger cabin of the vehicle 105 to collect images of the occupant 205. Based on the image data, as described above, the computer 110 can determine an acceleration of the head 210 of the occupant 205 relative to the vehicle 105.

Next, in a block 415, the computer 110 inputs the image data to a machine learning program to identify a respective bounding box 215 of the head 210 in each image 200. As described above, the machine learning program can be a conventional face detector program, e.g., RetinaFace, that identifies facial landmarks of the head 210 and determines the bounding box 215 as a rectangle that encloses the head 210.

Next, in a block 420, the computer 110 inputs the image data to a second machine learning program to identify a pose of the head 210. As described above, the pose is the set of three-dimensional linear coordinates along the X, Y, Z and rotational angles θ, ϕ, ω in the coordinate system. The machine learning program can be a conventional pose estimation program, e.g., Hopenet.

Next, in a block 425, the computer 110 determines the acceleration of the head 210 of the occupant 205 relative to the vehicle 105. As described above, the computer 110 can determine an absolute rotational acceleration of the head based on the rotational angles θ, ϕ, ω from the consecutive images 200 of the image data. Then, the computer 110 can apply a transformation matrix to transform the absolute rotational acceleration of the head 210 to the relative linear acceleration of the head 210, as described above.

Next, in a block 430, the computer 110 adjusts a suspension 120 based on the acceleration of the head 210. As described above, the suspension 120 can operate in one of a plurality of operation modes, and upon determining the relative acceleration of the head 210, the computer 110 can transition the suspension 120 to a different operation mode from a current operation mode. The computer 110 can determine the operation mode to which to transition based on a lookup table or the like.

Next, in a block 435, the computer 110 determines whether to continue the process 400. For example, the computer 110 can determine to continue the process 400 while the vehicle 105 is activated. If the computer 110 determines to continue, the process 400 returns to the block 405. Otherwise, the process 400 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

Ordinal adjectives such as "first" and "second" are used throughout this document as identifiers and are not intended to signify importance or order.

The invention claimed is:

1. A system, comprising a computer including a processor and a memory, the memory storing instructions executable by the processor to:
   identify a lateral acceleration of a vehicle and a longitudinal acceleration of the vehicle;
   determine an acceleration of a head of an occupant of the vehicle relative to the vehicle based on a difference between the lateral and longitudinal accelerations of the vehicle and an angular acceleration of the head, the angular acceleration of the head being based on respective poses of the head from a plurality of consecutive frames of image data; and
   adjust a vehicle suspension based on the determined acceleration.

2. The system of claim 1, wherein the instructions further include instructions to determine a roll acceleration of the head, a yaw acceleration of the head, and a pitch acceleration of the head.

3. The system of claim 1, wherein the instructions further include instructions to determine, based on the image data of the head, an absolute roll acceleration of the head, an absolute yaw acceleration of the head, and an absolute pitch acceleration of the head.

4. The system of claim 3, wherein the instructions further include instructions to determine the relative acceleration of the head as a difference between the absolute roll, yaw, and pitch accelerations and an acceleration of the vehicle.

5. The system of claim 1, wherein the instructions further include instructions to adjust a stiffness of a damper of the vehicle suspension based on the determined acceleration of the head.

6. The system of claim 1, wherein the instructions further include instructions to determine a respective bounding box enclosing the head of the occupant of each image of the image data.

7. The system of claim 6, wherein the instructions further include instructions to determine, based on the bounding boxes, an absolute acceleration of the head.

8. The system of claim 7, wherein the instructions further include instructions to determine the acceleration of the head based on a difference between the bounding boxes of consecutive frames of the image data and a difference between the accelerations of the head of consecutive frames of the image data.

9. The system of claim 1, wherein the instructions further include instructions to determine a velocity of the head of the occupant and to adjust the vehicle suspension based on the velocity and the determined acceleration of the head.

10. The system of claim 1, wherein the angular acceleration of the head of the occupant is at least one of a roll acceleration of the head, a yaw acceleration of the head, or a pitch acceleration of the head.

11. A method, comprising:
    identifying a lateral acceleration of a vehicle and a longitudinal acceleration of the vehicle;
    determining an acceleration of a head of an occupant of the vehicle relative to the vehicle based on a difference between the lateral and longitudinal accelerations of the vehicle and an angular acceleration of the head, the angular acceleration of the head being based on respective poses of the head from a plurality of consecutive frames of image data; and adjusting a vehicle suspension based on the determined acceleration.

12. The method of claim 11, further comprising determining a roll acceleration of the head, a yaw acceleration of the head, and a pitch acceleration of the head.

13. The method of claim 11, further comprising determining, based on the image data of the head, an absolute roll acceleration of the head, an absolute yaw acceleration of the head, and an absolute pitch acceleration of the head.

14. The method of claim 13, further comprising determining the relative acceleration of the head as a difference between the absolute roll, yaw, and pitch accelerations and an acceleration of the vehicle.

15. The method of claim 11, further comprising adjusting a stiffness of a damper of the vehicle suspension based on the determined acceleration of the head.

16. The method of claim 11, further comprising determining a respective bounding box enclosing the head of the occupant of each image of the image data.

17. The method of claim 16, further comprising determining, based on the bounding boxes, an absolute acceleration of the head.

18. The method of claim 17, further comprising determining the acceleration of the head based on a difference between the bounding boxes of consecutive frames of the image data and a difference between the accelerations of the head of consecutive frames of the image data.

* * * * *